Figure 1:
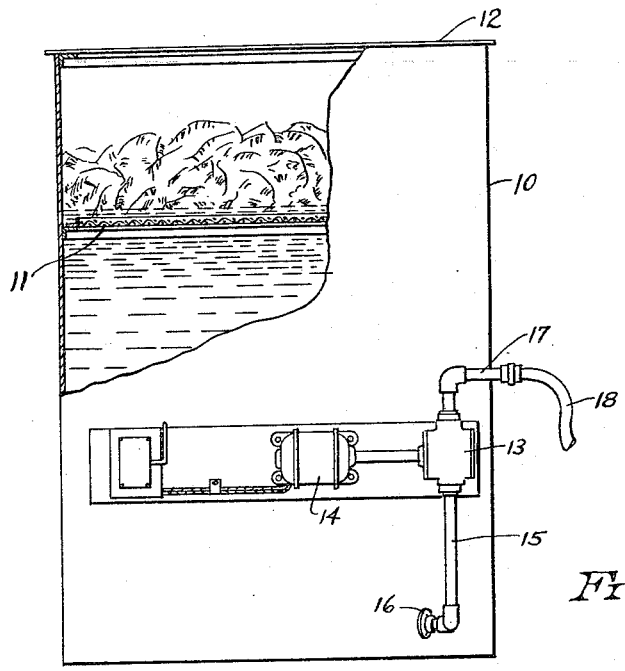

April 14, 1931. G. A. MAU 1,800,894

METHOD OF DISSOLVING A DELIQUESCENT MATERIAL

Filed Jan. 20, 1930

Inventor
George A. Mau
By Bates, Golrick & Teare
Attorney

Patented Apr. 14, 1931

1,800,894

UNITED STATES PATENT OFFICE

GEORGE A. MAU, OF CLEVELAND, OHIO, ASSIGNOR TO THE COAL TREATING EQUIPMENT COMPANY, OF CLEVELAND, OHIO, A CORPORATION OF OHIO

METHOD OF DISSOLVING A DELIQUESCENT MATERIAL

Application filed January 20, 1930. Serial No. 422,154.

This invention relates to a method and apparatus for dissolving a deliquescent material, such as calcium chloride, sodium chloride and the like. A solution of calcium chloride is particularly adapted for use in the treatment of coal and pavements to allay dust and also for the treatment of roads to prevent the formation of ice thereon. Heretofore, it has been the practice to dissolve calcium chloride in water by partially filling the tank with water and then placing the calcium chloride therein, and allowing it to settle to the bottom. It has been found however, that the calcium chloride when immersed in the water solidifies quickly and forms a hard mass which is difficult to disintegrate. Accordingly, mechanical agitating equipment has been used for dissolving the material. Such equipment usually comprises paddles which are rotatably mounted within the tank, and are suitably connected by reduction gears to a source of power, such as an electric motor.

The mechanical agitating equipment is only adapted for use however, in relatively small tanks, such as those having a capacity of 100 or 200 gallons. As the capacity of the tank increases, the size of the agitating equipment, gearing and motors increases to such extent that the cost of the installation is almost prohibitive. At each 250-gallon increase of tank capacity, the mechanical equipment must be enlarged and the cost increases so rapidly, that one method of solving the problem of installation expense, which has been under consideration, comprises the mixing of the chemical at the factory with water and then shipping the solution to the place of use. Obviously, however, the freight rates on water are a limiting factor to this procedure, particularly as at the present time, tanks having a capacity of ten thousand gallons are needed for the use of the treatment on a large scale.

Another method of dissolving the chemical has been to place it in a tank and upon a screen which is positioned above the normal water level, and to circulate the water by means of a pump through the material. In practice, the water is sprayed onto the material and is allowed to percolate therethrough, and is then recirculated continuously until the chemical is completely dissolved. This process, while not requiring all of the mechanical agitating apparatus heretofore used, is nevertheless objectionable, as it is relatively slow and necessitates the operation of the pump during the entire operation.

An object of the present invention therefore, is to provide a method of dissolving the deliquescent material in an expeditious manner, without the necessity for the use of any mechanical or hydraulic agitating equipment during the dissolving process. An additional object is to maintain the specific gravity substantially uniform throughout the tank.

Figure 2:
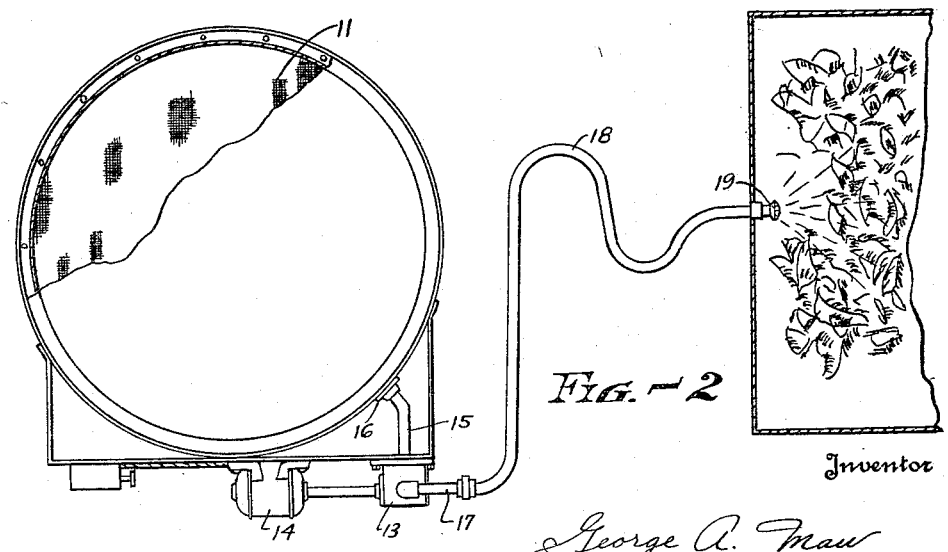

Referring now to the drawings, Fig. 1 shows a tank which is arranged to carry out the method which I have employed, and Fig. 2 is a plan view of the apparatus while the solution of the material is being used to allay dust.

Referring now to the drawings, 10 indicates a tank which has a perforated partition in the nature of a screen 11 supported therein and preferably in the upper region thereof. The screen extends across the tank and is adapted to support the chemical which, with the water, may be introduced into the tank through the top thereof when the lid 12 is open. The method and process is carried out by filling the tank with water until the level is above the top of the screen. For best results, I have found that a normal water level of about one inch above the screen produces satisfactory results. The chemical, such as calcium chloride in flake form, is then emptied from sacks or containers into the tank, where it is caught and suspended by the screen.

I have found upon pouring the chemical into the tank and suspending it in the upper region of the water, that surprising and unlooked for results have been attained. The chemical, instead of forming a hard mass, commences to dissolve immediately and to pass through the screen and to mix with the water, as it settles by gravity to the bottom. When calcium chloride is dissolved, an effervescent action occurs which agitates the water as the material is settling slowly in the tank. I believe that the rapidity of the dissolving process can be accounted for by reason of the fact that only finely divided particles of the material are subjected to the water, whereas heretofore when the chemical was not suspended but was allowed to settle immediately to the bottom, that part in contact with the water would start to dissolve and form an envelope around the inner part, and thus prevent access of the water thereto. This envelope would become a hard mass that necessitated mechanical agitation to disintegrate.

With the present method, the weight of the chemical acts upon that portion in contact with the screen and literally forces it through the screen so that each small particle is immediately and completely surrounded by water. Then, as quickly as the layer in contact with the screen is dissolved, it is replaced by another layer which in turn is subjected to the same action. Gradually then, the water rises and progressively dissolves the chemical. I have found that with this method, calcium chloride can be dissolved almost as rapidly as it can be poured into the tank in flake form from bags or other containers. In fact, only a few minutes are required to complete the dissolving operation after the last bag has been poured in.

Heretofore, it has been necessary to operate the agitating equipment for a relatively long period of time depending upon the size of tank. Under the present method only a few minutes are required on any size of tank for completing the solution after the material has been poured onto the screen. Furthermore, the specific gravity of the solution remains uniform throughout the tank without requiring any mechanical or hydraulic means for agitating or circulating the solution.

In practice, the normal level of the water at the start of the operation would only be, as heretofore stated, about one inch above the top of the screen. Thus, when the chemical is emptied into the tank, it is only partly submerged, and as successive bags are emptied in, the material is spread evenly so as to expedite the dissolving operation. As soon as the chemical is completely dissolved, the solution is ready for use.

To discharge the material from the tank, I have shown a pump 13, which in the case of small tanks may be mounted on the side of the tank and may be directly connected to an electric motor 14. The inlet conduit to the pump is indicated at 15, as being connected to the tank adjacent the bottom thereof, as at 16, while the discharge conduit 17 is shown as terminating in a flexible hose 18, and as having a nozzle 19 mounted at the outer end thereof. When large tanks are used, the operating unit is preferably supported independently of the tank and in the most convenient location with reference thereto.

The present invention possesses important commercial value as it opens up a large field for the use of calcium chloride to allay dust on a large scale on coal or to prevent the formation of snow and ice on roads. As applied to roads, considerable difficulty has heretofore been experienced in providing agitating equipment to dissolve the material satisfactorily on a large scale. With the present method, the chemical may be dissolved at a central storage point and then pumped into distributing tank wagons for immediate use. A further advantage of the present method is the fact that all agitating and circulating equipment may be eliminated, wherefore equipment sufficient to dissolve one thousand gallons can now be manufactured for substantially the same cost as that heretofore required for dissolving one-hundred gallons.

I claim:

1. A method of disolving a deliquescent material, having water soluble and insoluble portions, within a tank, having a relatively stationary screen extending across the tank, comprising filling the tank with water until the level thereof is above the screen, and the screen is under but near the upper surface of the water, placing the material to be dissolved upon the screen, and in such quantities that the material is only partly submerged until the dissolving operation is substantially completed, and utilizing a screen of sufficiently fine mesh to permit the soluble particles to pass therethrough, and to retain substantially all of the insoluble particles thereon.

2. A method of dissolving a deliquescent material within a tank, comprising partially filling the tank with water, suspending the material within the tank with the bottom of the mass of the material in contact with the water, but in close proximity to the level of the water, whereby only part of the material is submerged at the start of the dissolving operation, and maintaining the lower portion of the material in partially submerged position for substantially the entire dissolving operation, whereby the material will be dissolved progressively upwardly through the mass.

In testimony whereof, I hereunto affix my signature.

GEORGE A. MAU.